United States Patent [19]

Becker

[11] Patent Number: 4,479,878

[45] Date of Patent: Oct. 30, 1984

[54] HIGH CALCIUM TOLERANT DEPOSIT CONTROL METHOD

[75] Inventor: Larry W. Becker, Syracuse, N.Y.

[73] Assignee: Betz Laboratories, Inc., Trevose, Pa.

[21] Appl. No.: 437,382

[22] Filed: Oct. 28, 1982

[51] Int. Cl.$^3$ ............................................... C02F 5/14
[52] U.S. Cl. ..................................... 210/699; 252/180
[58] Field of Search ............... 210/699, 700; 252/180, 252/181

[56] References Cited

U.S. PATENT DOCUMENTS

| | | | |
|---|---|---|---|
| 3,214,454 | 10/1965 | Blaser et al. | 260/429.9 |
| 3,297,578 | 1/1967 | Crutchfield et al. | 252/99 |
| 3,621,081 | 11/1971 | Prentice | 252/175 |
| 3,723,333 | 3/1973 | von Freyhold | 252/175 |
| 3,738,806 | 6/1973 | Feiler | 252/99 |
| 3,803,047 | 4/1974 | Hwa | 252/181 |
| 3,803,048 | 4/1974 | Hwa | 252/181 |
| 3,959,168 | 5/1976 | Germscheid et al. | 210/700 |
| 4,020,091 | 4/1977 | Budnick | 260/429.7 |
| 4,118,318 | 10/1978 | Welder et al. | 210/700 |
| 4,209,398 | 6/1980 | Ii et al. | 252/180 |
| 4,237,005 | 12/1980 | Becker | 210/708 |
| 4,246,103 | 1/1981 | Block et al. | 210/699 |
| 4,253,912 | 3/1981 | Becker et al. | 162/76 |
| 4,253,969 | 3/1981 | Becker et al. | 210/699 |
| 4,254,063 | 3/1981 | Becker | 260/931 |

FOREIGN PATENT DOCUMENTS 2061249  5/1981  United Kingdom ............... 210/699

*Primary Examiner*—Peter Hruskoci
*Attorney, Agent, or Firm*—Alexander D. Ricci; Bruce E. Peacock

[57] ABSTRACT

A method of controlling deposition of scale and the like in waters having a high calcium ion content is disclosed. The method is applicable to waters having a calcium ion concentration of about 300 ppm $Ca^{+2}$ and comprises adding 1-hydroxypropylidene-1,1 diphosphonic acid or water soluble salt thereto. This particular compound is capable of performing the deposit control function in such high calcium waters without itself resulting in substantial deposit control agent-calcium adduct formation which would deleteriously affect the deposit control function.

6 Claims, No Drawings

HIGH CALCIUM TOLERANT DEPOSIT CONTROL METHOD

FIELD OF THE INVENTION

The present invention pertains to a method for controlling undesirable deposit formation in water systems and along metal surfaces and the like in contact with such water systems. Of particular pertinence is the fact that the present method is adapted for use in conjunction with those water systems having a high calcium ion concentration. In such cases, the use of conventional deposit control agents leads to the formation of undesirable deposit control agent-calcium adducts, which adducts seriously interfere with the intended functioning of the deposit control agent.

BACKGROUND OF THE INVENTION

Deposit control agents, such as phosphates, phosphonates, and polyacrylates, show similar responses as the concentration of calcium is increased in cooling waters and the like with the potential for precipitation of slightly soluble calcium salts. At very low (substoichiometric) treatment levels, these deposit control materials inhibit the nucleation and growth of crystals of calcium salts. The mechanism for this activity involves adsorption of the deposit control agent at the active growth site of the forming microcrystallites. If the concentration of calcium is increased, turbidity develops in the cooling water, indicating the formation of insoluble, calcium-deposit control agent adducts. If the deposit control agent concentration is increased to stoichiometric concentrations, this turbidity can be removed by chelation of the calcium ion to produce soluble calcium-containing species.

Because of the economics of water treatment in cooling systems, deposit control agents must function at substoichiometric concentrations. In waters containing high calcium concentrations, such as might be found in cooling systems operating at high cycles of concentration, calcium tolerant deposit control agents offer a distinct advantage. The concentration of these materials can be increased to meet the deposit control demands of the system without concern for their removal by formation of calcium containing adducts.

Formation of calcium-deposit control agent adducts has obvious negative consequences. The active or "free" deposit control agent concentration is limited, thus limiting deposition and corrosion control. Also, the adduct itself may foul the cooling system through the formation of an adduct deposit.

To alleviate this problem, the calcium concentration is often controlled by operating at lower cycles of concentration. However, such procedure also has obvious economic disadvantages.

Thus, a deposit control agent that is tolerant to high calcium concentrations provides definite advantages when used in cooling water systems and the like. The high treatment concentrations that may be required due to the deposition potential created by high calcium concentrations can be used without fear of fouling or loss of corrosion protection. Cycles of concentration need not be limited, providing economic benefits and conservation of water.

Accordingly, there is a need in the art for a method of controlling deposition in high calcium ion content waters, which method does not result in the substantial formation of adducts comprised of calcium ions and the deposit control agent.

PRIOR ART 1-hydroxypropylidene 1,1-diphosphonic acid (HPDP), which is used in accordance with the present method, is not new. However, the prior art, disclosing HPDP, does not disclose the use of this particular compound in high calcium ion content waters. For instance, in U.S. Pat. No. 3,297,578 (Crutchfield) various alkylidenediphosphonic acids, including 1-hydroxypropylidenediphosphonic acid, are disclosed as useful bleaching, sterilizing, disinfecting and deterging compositions.

Of similar interest is U.S. Pat. No. 3,214,454 (Blaser) which discloses various alkylidene diphosphonic acid compounds as being effective calcite inhibition agents. U.S. Pat. No. 3,723,333 (Freyhold) is noted as being of equivalent interest.

Of primary interest is U.S. Pat. No. 3,803,047 (Hwa) which discloses varied alkylidene diphosphonic acids, including HPDP, as corrosion inhibiting agents.

In summary, although the prior art has specified that HPDP is useful in water treatment applications, this particular compound, heretofore, has not been, according to the inventor's knowledge, used in high calcium ion containing waters.

DETAILED DESCRIPTION OF THE INVENTION

It has been surprisingly discovered that HPDP is extremely "calcium tolerant." This phrase is used to signify the fact that HPDP remains in solution in waters having calcium ion concentrations of 300 ppm and greater without forming an undesirable precipitate. Accordingly, the HPDP compound can exert its deposit control function in such waters without interference due to formation of calcium-deposit control agent adducts.

Although few naturally occurring waters possess calcium ion concentrations on the order of 300 ppm and greater, such water systems are typically encountered in recirculating-type cooling water systems, which for economical and environmental purposes, are forced to operate at high levels of concentration. Although the present method is ideally suited to provide effective deposit control protection in these particular systems, the method is equally applicable to all water systems for which deposit control protection is sought that possess such high calcium ion concentrations. For instance, boiler water systems, scrubber systems, salt water desalination, dust collecting systems and other water systems may benefit from the present invention.

It is noted that the term HPDP used herein should be so construed as to encompass all water soluble salt forms of this molecule.

Details as to the preparation of HPDP are given in U.S. Pat. No. 3,214,454. The disclosure of this patent is hereby incorporated by reference to the extent necessary to complete the instant disclosure.

The HPDP is added to the aqueous system for which treatment is desired in an amount of from about 0.1 to 500 parts per million based upon one million parts of the aqueous system. When HPDP is added to high calcium ion containing waters (as is shown herein in the examples), it remains in solution without resulting in formation of an adduct precipitate with calcium. Accordingly, the HPDP is still available to perform its intended deposit control function, in sharp contrast to the use of other deposit control agents, which, in such high calcium waters, form adducts with the available calcium and hence cannot perform adequately as deposit control treatments.

EXAMPLES

The invention will now be further described with reference to a number of specific examples which are to be regarded solely as illustrative, and not as restricting the scope of the invention.

To fully evaluate the deposit control efficacy of 1-hydroxypropylidene-1,1-diphosphonic acid (HPDP), tests were undertaken to measure the compound's ability to prevent bulk phase precipitation of calcium phosphate, calcium sulfate, and calcium carbonate, respectively, under conditions which would normally result in the precipitation of these particular salts. In this respect, it is important to recognize that the HPDP was evaluated at "substoichiometric" concentrations. Prevention of bulk phase precipitation at such "substoichiometric" levels is known in the art as "threshold" treatment.

The results in following Tables I, II and III are expressed as "percent inhibition" with positive values indicating that the stated percentage of precipitate was prevented from being formed. Except as where noted to the contrary, the following conditions, solutions, and testing procedure were utilized to perform the calcium phosphate, calcium sulfate and calcium carbonate inhibition tests.

| CALCIUM PHOSPHATE INHIBITION PROCEDURE | |
|---|---|
| Conditions | Solutions |
| T = 70° C. | 36.76 $CaCl_2.2H_2O$/liter $DIH_2O$ |
| pH 7.5 | 0.4482 g $Na_2HPO_4$/liter $DIH_2O$ |
| 17 hour equilibrium | |
| $Ca^{+2}$ = 100 ppm (as $Ca^{+2}$) | |
| $PO_4^{-3}$ = 6 ppm | |

Procedure (1) To about 1800 ml $DIH_2O$ in a 2 liter volumetric flask, add 20 ml of $CaCl_2.2H_2O$ solution followed by 2 drops of conc. HCl.
(2) Add 40 ml of $Na_2HPO_4$ solution.
(3) Bring volume to 2 liters with DI water.
(4) Place 100 ml aliquots of solution in 4 oz. glass bottles.
(5) Add treatment.
(6) Adjust pH as desired.
(7) Place in 70° C. water bath and equilibrate for 17 hours.
(8) Remove samples and filter while hot through $0.2\mu$ filters.
(9) Cool to room temperature and take Absorbance measurements using Leitz photometer (640 nm).
  Preparation for Leitz
   a. 5 mls filtrate
   b. 10 mls Molybdate Reagent
   c. 1 dipper Stannous Reagent
   d. Swirl 1 minute, pour into Leitz cuvette; wait 1 minute before reading.
(10) Using current calibration curve (Absorbance vs. ppm $PO_4^{-3}$) find ppm $PO_4^{-3}$ of each sample.

Calculation $$\% \text{ Inhibition} = \frac{\text{ppm } PO_4^{-3}(\text{treated}) - \text{ppm } PO_4^{-3}(\text{control})}{\text{ppm } PO_4^{-3}(\text{stock}) - \text{ppm } PO_4^{-3}(\text{control})} \times 100$$

| CALCIUM SULFATE INHIBITION PROCEDURE | |
|---|---|
| Conditions | Chemicals |
| pH = 7.0 | 1 × 10$^{-1}$ M $CaCl_2.2H_2O$ |
| T = 50° C. | 1 × 10$^{-1}$ M $Na_2SO_4$ |
| 24 hr. equilibrium | |
| $Ca^{+2}$ = 2000 ppm | |
| $SO_4^{-2}$ = 4800 ppm | |

Procedure (1) Add 50 ml of 10$^{-1}$ $CaCl_2.2H_2O$ pre-adjusted to pH 7.0 to a 4 oz. bottle.
(2) Add treatment.
(3) Add 50 ml of 10$^{-1}$ $Na_2SO_4$ pre-adjusted to pH 7.0.
(4) Heat samples for 24 hours in a 50° C. water bath.
(5) Cool for 30 minutes, at least.
(6) Filter 5 ml through $0.45\mu$ filters.
(7) Add NaOH to pH 12.0 and dilute to 50 ml with DI $H_2O$.
(8) Add $Ca^{+2}$ indicator (1 level).
(9) Titrate to purple-violet endpoint with EDTA.

Calculation $$\% \text{ Inhibition} = \frac{\text{mls titrant (treated)} - \text{mls titrant (control)}}{\text{mls titrant } (Ca^{+2} \text{ stock}) - \text{mls titrant (control)}} \times 100$$

| Calcium Carbonate Inhibition Standard Test (pH 9.0) | |
|---|---|
| Conditions | Solutions |
| pH 9.0 | 3.25 g $CaCl_2.2H_2O$/liter DI $H_2O$ |
| T = 70° C. | 2.48 g $Na_2CO_3$/liter DI $H_2O$ |
| 5 hour equilibrium | |
| 442 ppm $Ca^{+2}$ | |
| 702 ppm $CO_3$ | |

Procedure (1) 50 ml $CaCl_2.2H_2O$ pre-adjusted to pH 9.0
(2) Treatment
(3) 50 ml $Na_2CO_3$ pre-adjusted to pH 9.0
(4) Heat 5 hours at 70° C. water bath. Remove and cool to room temperature.
(5) Filter 5 mls through 0.2u filters.
(6) Adjust samples to pH<1.0 with conc. HCl (~1 g Conc. HCl)
(7) Allow to stand at least 15 minutes.
(8) Dilute to 50 mls with DI $H_2O$.
(9) Bring pH to 12.0 with NaOH.
(10) Add $Ca^{+2}$ indicator (1 level).
(11) Titrate with EDTA to purple-violet endpoint.

Calculation $$\% \text{ Inhibition} = \frac{\text{ml EDTA titrated(treated)} - \text{ml EDTA titrated(control)}}{\text{ml EDTA titrated } (Ca^{+2} \text{ stock})^* - \text{ml EDTA titrated(control)}} \times 100$$

*should be 5.53 mls EDTA

TABLE I

| | Calcium Phosphate Inhibition | | |
| --- | --- | --- | --- |
| | % Inhibition | | |
| Treatment | 5 ppm (Actives) | 10 ppm (Actives) | 20 ppm (Actives) |
| HPDP | 6.9 | 7.9 | 7.9 |
| DEQUEST 2010 | 5.7 | 17.1 | 4.6 |
| DEQUEST 2000 | 8.6 | 13.2 | 16.7 |

DEQUEEST 2010 = 1 hydroxyethylidene-1,1 diphosphonic acid (HEDP) available from MONSANTO.
DEQUEST 2000 = Aminotri(methylenephosphonic acid) (ATP) available from MONSANTO.

TABLE II

| | Calcium Sulfate Inhibition | | |
| --- | --- | --- | --- |
| | % Inhibition | | |
| Treatment | 0.5 ppm (Actives) | 1 ppm (Actives) | 3 ppm (Actives) |
| HPDP | 2.3 | 5.3 | 10.2 |
| DEQUEST 2010 | 0.8 | 5.3 | 11.2 |
| DEQUEST 2000 | 0 | 10.9 | 93.1 |

TABLE III

| | Calcium Carbonate Inhibition | | |
| --- | --- | --- | --- |
| | % Inhibition | | |
| Treatment | 1 ppm (Actives) | 3 ppm (Actives) | 5 ppm (Actives) |
| HPDP | 43 | 67 | 71 |
| DEQUEST 2000 | 58 | 69 | 70 |
| DEQUEST 2010 | 46 | 63 | 68 |

DISCUSSION

It is clear that the Calcium Phosphate, Calcium Sulfate, and Calcium Carbonate inhibition of HPDP is comparable to that of the well-known DEQUEST materials herein tested. Accordingly, this data indicates that HPDP is a useful, threshold agent for deposit inhibition.

CALCIUM TOLERANCE

As previously mentioned, in treated aqueous systems containing high calcium hardness conditions, the potential exists for the uncontrolled precipitation of calcium-deposit control agent adducts. As the need is created to add more deposit control agent to prevent deposit agglomeration throughout the treated water system, this problem of uncontrolled calcium-deposit control agent adduct formation is exacerbated.

Table IV demonstrates the ability of HPDP, in contrast to other well-known deposit control agents, in withstanding various calcium concentrations at 60° C. The test procedure used to determine calcium tolerance of the materials was as follows: solutions containing 400 ppm $Ca^{+2}$ and 2000 ppm $Ca^{+2}$ were prepared at pH=9. To these solutions, 20 ppm (actives) of the desired treatment were added and the pH was readjusted to 9 with NaOH if necessary. The solutions were placed in a water bath at 60° C. for 10 minutes. The presence of precipitation was detected by the Tyndall effect.

TABLE IV

| | Calcium Tolerance | |
| --- | --- | --- |
| Treatment | 400 ppm $Ca^{+2}$ | 2,000 ppm $Ca^{+2}$ |
| HPDP | Clear | Clear |
| DEQUEST 2010 | Very Cloudy | Very Cloudy |
| DEQUEST 2000 | Very Cloudy | Very Cloudy |

DISCUSSION

It was surprisingly discovered that the HPDP remained clear in solution in the 400 ppm $Ca^{+2}$ and 2,000 ppm $Ca^{+2}$ tests. In sharp contrast, the Dequest materials formed excessive precipitates as shown by the cloudy conditions resulting from their tests. These results are highly unexpected in light of the fact that the Dequest 2010 material differs from HPDP by the omission of only 1 carbon atom from the HPDP backbone. It is therefore surprising that the addition of one carbon atom to the chain should have any effect on calcium tolerance whatsoever.

While I have shown and described herein certain embodiments of the present invention, it is intended that there be covered as well any change or modification therein which may be made without departing from the spirit and scope of the invention as defined in the appended claims.

I claim:

1. Method of controlling the deposition of scale imparting precipitates on the structural parts of a system exposed to an aqueous medium having a pH of at least about 7 and containing scale imparting precipitates under deposit forming conditions and a calcium ion concentration of about 400 ppm (as $Ca^{+2}$) and greater, said method comprising adding to said aqueous medium an effective amount for the purpose of 1-hydroxy propylidene-1,1-diphosphonic acid (HPDP) or water soluble salt thereof; said HPDP being capable of performing said control of deposition without resulting in substantial formation of an adduct precipitate with said calcium said scale imparting precipitates comprising a member selected from the group consisting of calcium sulfate, calcium phosphate, and calcium carbonate, and mixtures thereof.

2. Method as defined in claim 1 comprising adding about 0.1–500 parts of said HPDP per million parts of said aqueous medium.

3. Method as defined in claim 1 wherein said system is a cooling water system.

4. Method as defined in claim 1 wherein said system is a steam generating system.

5. Method as defined in claim 1 wherein said system is a gas scrubbing system.

6. Method as defined in claim 1 wherein said calcium ion concentration is about 500 ppm or greater.

* * * * *